United States Patent
Jain et al.

(10) Patent No.: US 11,434,781 B2
(45) Date of Patent: Sep. 6, 2022

(54) FRANGIBLE GAS TURBINE ENGINE AIRFOIL INCLUDING AN INTERNAL CAVITY

(71) Applicant: General Electric Company, Schenectady, NY (US)

(72) Inventors: Nitesh Jain, Bangalore (IN); David William Crall, Loveland, OH (US); Nicholas Joseph Kray, Mason, OH (US); Daniel Edward Mollmann, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 16/161,233

(22) Filed: Oct. 16, 2018

(65) Prior Publication Data
US 2020/0116044 A1  Apr. 16, 2020

(51) Int. Cl.
| | | |
|---|---|---|
| *F01D 21/04* | (2006.01) | |
| *F01D 5/14* | (2006.01) | |
| *F01D 5/28* | (2006.01) | |
| *B33Y 80/00* | (2015.01) | |

(52) U.S. Cl.
CPC ........... *F01D 21/045* (2013.01); *F01D 5/141* (2013.01); *B33Y 80/00* (2014.12); *F01D 5/282* (2013.01); *F05D 2230/31* (2013.01); *F05D 2240/30* (2013.01); *F05D 2300/6034* (2013.01)

(58) Field of Classification Search
None
See application file for complete search history.

(56) References Cited

U.S. PATENT DOCUMENTS

| | | | |
|---|---|---|---|
| 3,096,930 | A | 7/1963 | Meyerhoff |
| 3,156,808 | A | 11/1964 | Davies et al. |
| 3,175,804 | A | 3/1965 | Bunger |
| 3,394,918 | A | 7/1968 | Wiseman |
| 3,626,568 | A | 12/1971 | Silverstein et al. |
| 3,761,201 | A | 9/1973 | Silverstein et al. |
| 4,000,956 | A | 1/1977 | Carlson et al. |
| 4,022,540 | A | 5/1977 | Young |
| 4,022,547 | A | 5/1977 | Stanley |
| 4,043,703 | A | 8/1977 | Carlson |
| 4,071,184 | A | 1/1978 | Carlson et al. |

(Continued)

FOREIGN PATENT DOCUMENTS

| | | |
|---|---|---|
| CN | 103174466 A | 6/2013 |
| CN | 103628923 B | 3/2016 |

(Continued)

*Primary Examiner* — Kayla Mccaffrey
(74) *Attorney, Agent, or Firm* — Dority & Manning, P.A.

(57) ABSTRACT

An airfoil defining a span extending between a root and a tip. The airfoil includes a frangible airfoil portion extending between a leading edge and a trailing edge and extending between the tip and a fusion line along the span. The frangible airfoil portion includes a first material defining a first modulus of elasticity and further defines an internal cavity. The airfoil includes a residual airfoil portion coupled to the frangible airfoil portion extending from the fusion line to the root along the span and including a second material defining a second modulus of elasticity greater than the first modulus of elasticity. The residual airfoil portion meets the frangible airfoil portion at the fusion line.

18 Claims, 5 Drawing Sheets

(56) References Cited

U.S. PATENT DOCUMENTS

| | | | |
|---|---|---|---|
| 4,111,600 A | 9/1978 | Rothman et al. | |
| 4,426,193 A * | 1/1984 | Carlson | B21H 7/16 |
| | | | 29/889.71 |
| D273,037 S | 3/1984 | Dodge | |
| 4,971,641 A | 11/1990 | Nelson et al. | |
| 5,112,194 A | 5/1992 | More | |
| 5,123,813 A | 6/1992 | Przytulski et al. | |
| 5,129,787 A | 7/1992 | Violette et al. | |
| 5,141,400 A | 8/1992 | Murphy et al. | |
| 5,222,297 A | 6/1993 | Graff et al. | |
| 5,269,658 A | 12/1993 | Carlson et al. | |
| 5,363,554 A | 11/1994 | Partridge et al. | |
| 5,375,978 A | 12/1994 | Evans et al. | |
| 5,392,514 A | 2/1995 | Cook et al. | |
| 5,449,273 A | 9/1995 | Hertel et al. | |
| 5,486,096 A | 1/1996 | Hertel et al. | |
| 5,520,532 A | 5/1996 | Reinfelder et al. | |
| 5,580,217 A | 12/1996 | Richards et al. | |
| 5,738,491 A | 4/1998 | Lee et al. | |
| 5,836,744 A | 11/1998 | Zipps et al. | |
| 5,843,354 A | 12/1998 | Evans et al. | |
| 5,844,669 A | 12/1998 | Wang et al. | |
| 5,908,285 A | 6/1999 | Graff | |
| 5,935,360 A | 8/1999 | Griggs | |
| 5,939,006 A | 8/1999 | Wang et al. | |
| 6,146,099 A | 11/2000 | Zipps et al. | |
| 6,206,642 B1 | 3/2001 | Matheny et al. | |
| 6,241,469 B1 | 6/2001 | Beeck et al. | |
| 6,290,895 B1 | 9/2001 | Wang et al. | |
| 6,294,113 B1 | 9/2001 | Woodmansee et al. | |
| 6,402,469 B1 | 6/2002 | Kastl et al. | |
| 6,413,051 B1 | 7/2002 | Chou et al. | |
| 6,516,865 B1 | 2/2003 | Beeck et al. | |
| 6,709,230 B2 | 3/2004 | Morrison et al. | |
| 6,843,565 B2 | 1/2005 | Evans et al. | |
| 7,114,912 B2 | 10/2006 | Gerez et al. | |
| 7,736,130 B2 | 6/2010 | Schilling et al. | |
| 7,780,410 B2 | 8/2010 | Kray et al. | |
| 7,794,197 B2 | 9/2010 | Thompson et al. | |
| 7,837,446 B2 | 11/2010 | McMillan | |
| 7,972,109 B2 | 7/2011 | Crall et al. | |
| 8,038,408 B2 | 10/2011 | McMillan | |
| 8,083,487 B2 | 12/2011 | Wood et al. | |
| 8,100,662 B2 | 1/2012 | Schreiber | |
| 8,109,734 B2 | 2/2012 | Backhouse | |
| 8,146,250 B2 | 4/2012 | Moroso | |
| 8,234,990 B2 | 8/2012 | Xie et al. | |
| 8,251,640 B2 | 8/2012 | Beckford et al. | |
| 8,366,378 B2 | 2/2013 | Beckford et al. | |
| 8,459,955 B2 | 6/2013 | McMillan et al. | |
| 8,573,936 B2 | 11/2013 | Lafont | |
| 8,647,072 B2 | 2/2014 | McMillan | |
| 8,685,297 B2 | 4/2014 | Schreiber | |
| 9,085,989 B2 * | 7/2015 | Shah | F01D 5/282 |
| 9,157,139 B2 | 10/2015 | Rajagopalan | |
| 9,200,593 B2 | 12/2015 | Huth | |
| 9,243,512 B1 | 1/2016 | Zatorski et al. | |
| 9,321,100 B2 | 4/2016 | Dambrine et al. | |
| 9,410,437 B2 | 8/2016 | Paige et al. | |
| 9,475,119 B2 | 10/2016 | Cui et al. | |
| 9,556,742 B2 | 1/2017 | Parkin et al. | |
| 9,689,269 B2 | 6/2017 | Bottome | |
| 9,752,444 B2 | 9/2017 | Haag | |
| 9,878,501 B2 | 1/2018 | Zatorski et al. | |
| 9,914,282 B2 | 3/2018 | Roach et al. | |
| 9,945,234 B2 | 4/2018 | Jevons et al. | |
| 9,995,164 B2 | 6/2018 | Nishijima et al. | |
| 2005/0106002 A1 | 5/2005 | Gerez et al. | |
| 2006/0188736 A1 | 8/2006 | Luthra et al. | |
| 2007/0036658 A1 | 2/2007 | Morris | |
| 2007/0202296 A1 | 8/2007 | Chandrasekaran et al. | |
| 2008/0273983 A1 | 11/2008 | Clark et al. | |
| 2009/0035131 A1 | 2/2009 | McMillan | |
| 2009/0269203 A1 | 10/2009 | Care et al. | |
| 2010/0054937 A1 | 3/2010 | Beckford et al. | |
| 2010/0150707 A1 | 6/2010 | Jevons | |
| 2010/0242843 A1 | 9/2010 | Peretti et al. | |
| 2010/0296942 A1 | 11/2010 | Jevons | |
| 2011/0023301 A1 | 2/2011 | Jones | |
| 2011/0027096 A1 | 2/2011 | Northfield | |
| 2011/0049297 A1 | 3/2011 | Jevons et al. | |
| 2011/0052405 A1 | 3/2011 | Parkin | |
| 2011/0129351 A1 | 6/2011 | Das et al. | |
| 2011/0182743 A1 | 7/2011 | Naik | |
| 2011/0194941 A1 | 8/2011 | Parkin et al. | |
| 2011/0217156 A1 | 9/2011 | McMillan | |
| 2011/0217160 A1 | 9/2011 | McMillan | |
| 2011/0223027 A1 | 9/2011 | Klinetob et al. | |
| 2011/0299990 A1 | 12/2011 | Marra et al. | |
| 2012/0003100 A1 | 1/2012 | James et al. | |
| 2012/0021243 A1 | 1/2012 | Kray et al. | |
| 2012/0028055 A1 | 2/2012 | Schmidt | |
| 2012/0034089 A1 | 2/2012 | Wadewitz et al. | |
| 2012/0051935 A1 | 3/2012 | Naik et al. | |
| 2012/0082556 A1 | 4/2012 | Macchia et al. | |
| 2012/0100006 A1 | 4/2012 | Merriman et al. | |
| 2015/0218953 A1 | 8/2015 | Bottome | |
| 2016/0010468 A1 * | 1/2016 | Kray | F01D 5/28 |
| | | | 415/200 |
| 2016/0123159 A1 | 5/2016 | Thompson | |
| 2016/0167269 A1 | 6/2016 | Pautard | |
| 2016/0201503 A1 | 7/2016 | Zatorski et al. | |
| 2016/0263856 A1 * | 9/2016 | Roach | B32B 7/02 |
| 2017/0107823 A1 * | 4/2017 | Roberts | F01D 5/22 |
| 2017/0226867 A1 * | 8/2017 | Nandula | F01D 5/282 |
| 2017/0254207 A1 | 9/2017 | Schetzel et al. | |
| 2017/0321714 A1 | 11/2017 | Jain et al. | |
| 2017/0335856 A1 | 11/2017 | Lander et al. | |
| 2017/0363062 A1 | 12/2017 | Merzhaeuser et al. | |
| 2017/0370376 A1 | 12/2017 | Kray et al. | |
| 2018/0119551 A1 | 5/2018 | Romero et al. | |
| 2018/0178489 A1 | 6/2018 | M'Membe et al. | |

FOREIGN PATENT DOCUMENTS

| | | |
|---|---|---|
| CN | 107044445 A | 8/2017 |
| EP | 0526057 A1 | 2/1993 |
| FR | 2953225 A1 | 6/2011 |
| FR | 2994708 A1 | 2/2014 |
| GB | 2450139 A | 12/2008 |
| JP | 2001041002 A | 2/2001 |
| WO | WO2008122751 A2 | 10/2008 |

* cited by examiner

FRANGIBLE GAS TURBINE ENGINE AIRFOIL INCLUDING AN INTERNAL CAVITY

FIELD

The present subject matter relates generally to airfoils, and more particularly, to frangible airfoils for gas turbine engines including an internal cavity.

BACKGROUND

Airfoils used in aircraft engines, such as fan blades of a gas turbine engine, can be susceptible to extreme loading events. For instance, a fan blade might strike a bird that is ingested into the engine, or a blade-out occurrence may arise wherein one of the fan blades is severed from a rotor disk. If the impact is large enough, a fan blade may break apart into one or more shards before traveling downstream through the engine.

Gas turbine engines, such as turbofans, generally include fan cases surrounding a fan assembly including the fan blades. The fan cases are generally configured to withstand an impact of the fan blades due to adverse engine conditions resulting in a failure mode, such as foreign object damage, hard rubs due to excessive or extreme unbalance or fan rotor oscillations, or fan blade liberation. However, such airfoil configurations generally increase the weight of the fan case, thereby increasing the weight of the engine and aircraft and reducing performance and efficiency.

Known fan cases generally include frangible structures, such as honeycombs or trench-filler material, configured to mitigate load transfer to and through the fan case. However, this approach is generally costly. Furthermore, this approach may result in larger, heavier, less efficient fan cases. Still further, this approach may not address issues relating to fan rotor unbalance following deformation or liberation of one or several airfoils such as fan blades.

As such, there is a need for an airfoil that enables a controlled and consistent failure mode of the airfoil that may enable reducing a cost, weight, and load transfer to a surrounding casing.

BRIEF DESCRIPTION

Aspects and advantages will be set forth in part in the following description, or may be obvious from the description, or may be learned through practice of the invention.

In one aspect, the present subject matter is directed to an airfoil defining a span extending between a root and a tip. The airfoil includes a frangible airfoil portion extending between a leading edge and a trailing edge and extending between the tip and a fusion line along the span. The frangible airfoil portion includes a first material defining a first modulus of elasticity. Further, the frangible airfoil portion defines an internal cavity. The airfoil further includes a residual airfoil portion coupled to the frangible airfoil portion extending from the fusion line to the root along the span. The residual airfoil portion includes a second material defining a second modulus of elasticity greater than the first modulus of elasticity. The residual airfoil portion meets the frangible airfoil portion at the fusion line.

In one embodiment, the frangible airfoil portion deforms or partially or fully detaches relative to the residual airfoil portion at the fusion line following an event creating imbalance. In another embodiment, the airfoil may be a fan blade of a gas turbine engine. In a further embodiment, the frangible airfoil portion may be directly bonded to the residual airfoil portion at the fusion line. In another embodiment, the frangible airfoil portion may extend from the tip along at least 10% of the span toward the root. For instance, in one embodiment, the frangible airfoil portion may extend from the tip along at least 15% but less than 50% of the span towards the root. In a further embodiment, the internal cavity has a cavity height extending along 5% to 10% of the span. In another embodiment, the airfoil may further define a chord at each point along the span extending between the leading edge and the trailing edge. In such an embodiment, the internal cavity may define a cavity length along the chord at each point along the span. Further, the cavity length may extend between 33% and 66% of the chord at each point along the span. In certain embodiments, the cavity length at a first point along the span may be different than the cavity length at a second point along the span.

In one embodiment, the airfoil may define a pressure side and a suction side. In such an embodiment, the internal cavity may define a cavity width at each point along the span extending at least partially between the pressure side and suction side. Further, the cavity width at a first point along the span may be different than the cavity width at a second point along the span. In another embodiment, a leading edge sheath may be coupled to at least a portion of the leading edge of the airfoil and at least partially extend along at least one of the pressure side or suction side.

In certain embodiments, the frangible airfoil portion may further define a second internal cavity. In a further embodiment, the frangible airfoil portion may be formed via additive manufacturing.

In another aspect, the present subject matter is directed to a gas turbine engine defining a central axis. The gas turbine engine includes an engine shaft extending along the central axis, a compressor attached to the engine shaft and extending radially about the central axis, a combustor positioned downstream of the compressor to receive a compressed fluid therefrom, a turbine mounted on the engine shaft downstream of the combustor to provide a rotational force to the compressor, and a plurality of airfoils operably connected to the engine shaft. Each of the plurality of airfoils defines a span extending between a root and a tip. Each airfoil includes a frangible airfoil portion extending between a leading edge and a trailing edge and extending between the tip and a fusion line along the span. The frangible airfoil portion includes a first material defining a first modulus of elasticity. Further, the frangible airfoil portion defines an internal cavity. The airfoil further includes a residual airfoil portion coupled to the frangible airfoil portion extending from the fusion line to the root along the span. The residual airfoil portion includes a second material defining a second modulus of elasticity greater than the first modulus of elasticity. The residual airfoil portion meets the frangible airfoil portion at the fusion line.

In one embodiment, the gas turbine engine may further include a fan section including the plurality of airfoils configured as fan blades. It should be further understood that the gas turbine engine may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A frangible airfoil for gas turbine engines is generally provided. The airfoil may include frangible airfoil portion extending between the airfoil tip and the fusion line. The frangible airfoil portion may include a first material defining a first modulus of elasticity. Further, the frangible airfoil portion may define an internal cavity. The airfoil may include a residual airfoil portion extending between the fusion line and an airfoil root along the span. The residual airfoil portion may include a second material defining a second modulus of elasticity greater than the first modulus of elasticity. The residual airfoil portion meets the frangible airfoil portion at the fusion line. As such, the frangible airfoil portion positioned radially outward from the fusion line may include a reduced bending stiffness such that the frangible airfoil portion may break-off or bend during a failure mode of the airfoil. For example, the embodiments generally shown and described herein may enable a controlled and consistent failure of the airfoil, such as a fan blade, following a failure event, such as a hard rub against a surrounding fan case. The embodiments generally described herein enable the airfoil to deform or detach at a desired span of the airfoil to mitigate load transfer to a surrounding casing. The embodiments generally provided herein may further enable the airfoil to deform or detach such that excessive or extreme unbalance of the fan rotor may be reduced following a failure event, such as airfoil liberation, foreign object damage (e.g., bird strikes, icing, etc.), or loss of lube or damper to a bearing assembly.

Figure 1:
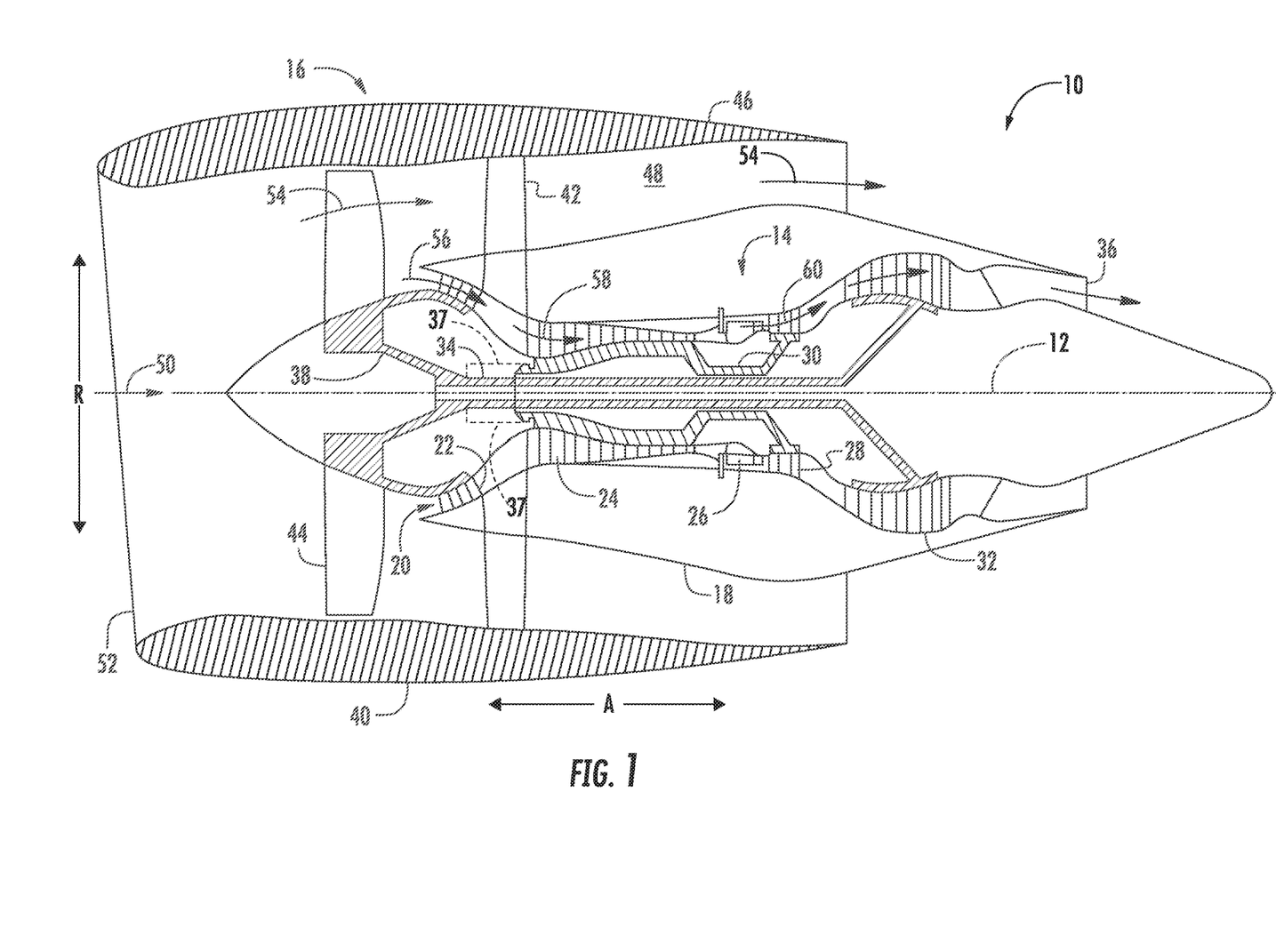
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the centerline 12. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Figure 2:
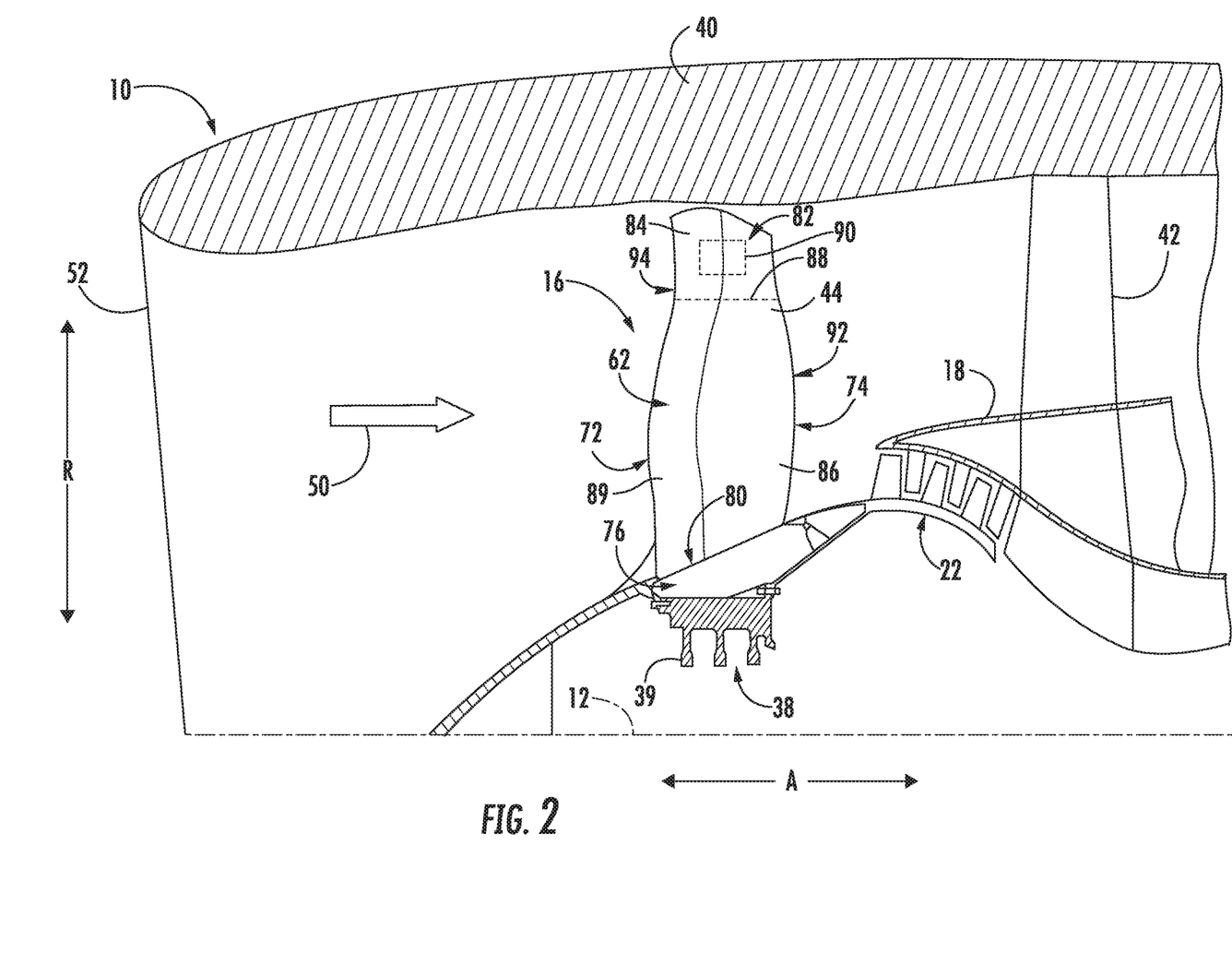
FIG. 2 illustrates a cross-sectional view of the fan section of FIG. 1 in accordance with aspects of the present subject matter, particularly illustrating a fan blade of the fan section.

Additionally, as shown in FIGS. 1 and 2, the fan section 16 of the gas turbine engine 10 generally includes a rotatable, axial-flow fan rotor 38 that configured to be surrounded by an annular fan casing 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 3:
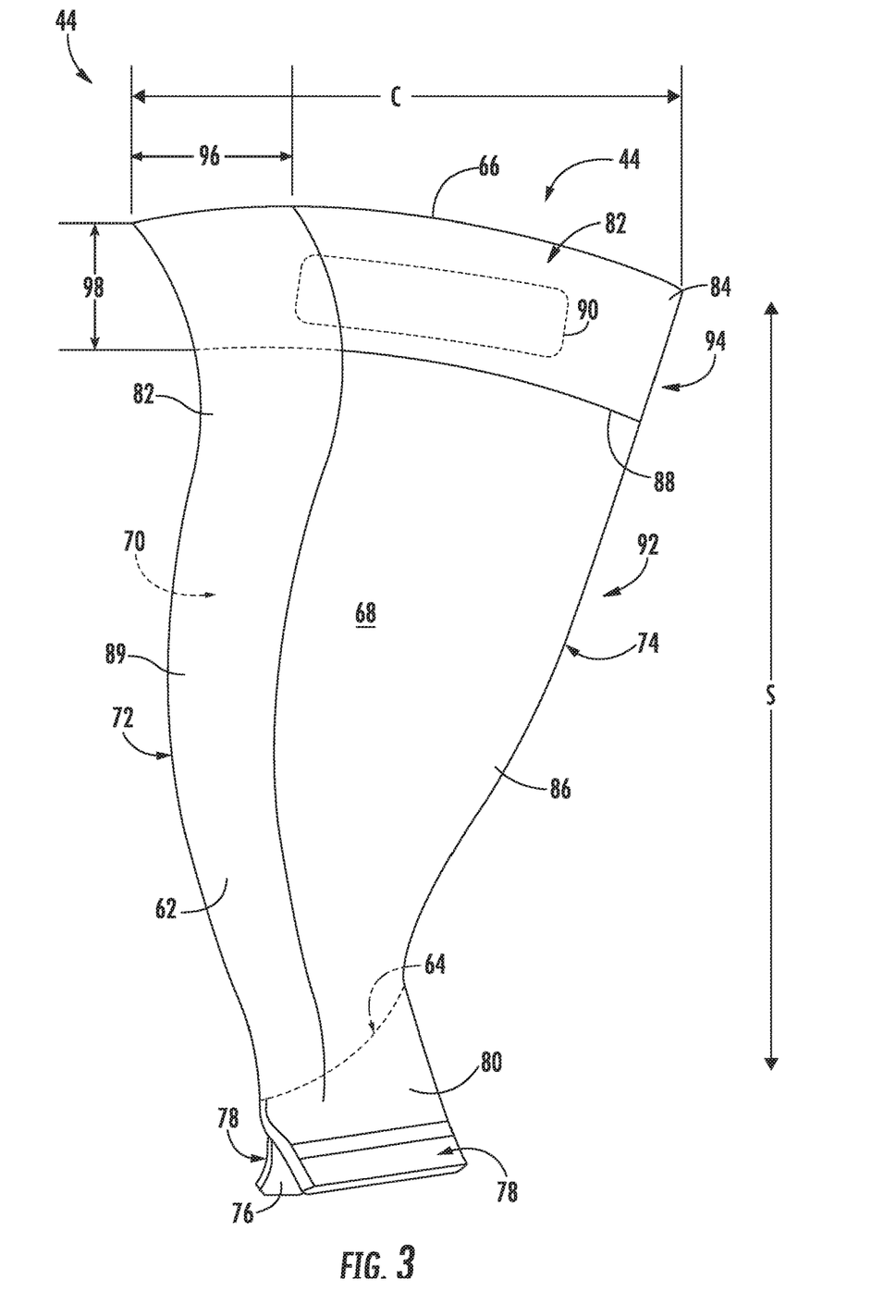
FIG. 3 illustrates a fan blade of the fan section of FIGS. 1 and 2 in accordance with aspects of the present subject matter, particularly illustrating a frangible airfoil portion of the fan blade.

Referring to FIGS. 2 and 3, exemplary airfoil 62 embodiments are provided in the context of a fan blade 44. Although the illustrated airfoils 62 are shown as part of a fan blade 44, it is understood that the following discussion of an airfoil 62 may be equally applied to another airfoil embodiment, e.g., a stator vane or rotor blade of a compressor 22, 24 and/or turbine 28, 32 (see FIG. 1). As shown, each fan blade 44 extends radially outwardly along a span S from an airfoil root 64 to an airfoil tip 66. A pressure side 68 and a suction side 70 of the airfoil 62 extend from the airfoil's leading edge 72 to a trailing edge 74 and between the airfoil root 64 and airfoil tip 66 along the span S. Further, it should be recognized that airfoil may define a chord C at each point along the span S between the airfoil root 64 and the airfoil tip 66. Further, the chord C may vary along the span of the airfoil 62. For instance, in the depicted embodiment, the chord C increases along the span S toward the airfoil tip 66. Though, in other embodiments, the chord C may be approximately constant throughout the span S or may decrease from the airfoil root 64 to the airfoil tip 66.

Optionally, each fan blade 44 includes an integral component having an axial dovetail 76 with a pair of opposed pressure faces 78 leading to a transition section 80. When mounted within the gas turbine engine 10, as illustrated in FIG. 2, the dovetail 76 is disposed in a dovetail slot of the fan rotor disk 39, thereby attaching the fan blades 44 to the fan rotor 38.

The airfoil 62 may define a frangible airfoil portion 94 at the airfoil tip 66 extending between the leading edge 72 and the trailing edge 74 and extending between the airfoil tip 66 and a fusion line 88 along the span S. The frangible airfoil portion 94 may include a first material 84 defining a first modulus of elasticity. In one embodiment, the airfoil 62 may define a residual airfoil portion 92 extending from the airfoil root 64 to the fusion line 88 along the span S of the airfoil 62. The residual airfoil portion 92 may include a second material 86 defining a second modulus of elasticity greater than the first modulus of elasticity. The frangible airfoil portion 94 may meet the residual airfoil portion 92 at the fusion line 88. Further, the fusion line 88 may generally extend along the chord C toward the trailing edge 74. It should be recognized that the fusion line 88 may generally extend along the chord C at approximately the same point along the span. In other embodiments, the fusion line 88 may at least partially extend radially inward or outward (e.g., along the span S) as the fusion line 88 extends axially along the chord C toward the trailing edge 74.

Further, the frangible airfoil portion defines an internal cavity 82. In such an embodiment, internal cavity 82 may extend at least partially between the airfoil tip 66 and the fusion line 88. Further, the internal cavity may extend at least partially between the leading edge 72 and the trailing edge 74 as well as at least partially between the pressure side 68 and the suction side 70 as described in more detail below. In certain embodiments, as illustrated, the internal cavity 82 may be hollow, but it should be recognized that in further embodiments the internal cavity 82 may be at least partially filled with a filler material. The first material 84 and the internal cavity 82 may define a frangible airfoil portion 94 that has a reduced overall bending stiffness compared to the residual airfoil portion 92, as described in more detail below in regards to FIGS. 3-7.

In one embodiment, the frangible airfoil portion 94 may be coupled to the residual airfoil portion 92 at the fusion line 88. For instance, in certain embodiments, the frangible airfoil portion 94 may be bonded to the residual airfoil portion 92. More particularly, in one embodiment, the frangible airfoil portion 94 may be directly bonded to the residual airfoil portion 92 at the fusion line 88. Though, in other embodiments, the frangible airfoil portion 94 may be coupled to the residual airfoil portion 92 using any suitable means, such as by adhesives, tape, welding, fusing, and/or mechanical fasteners (e.g., bolts, screws, and rivets). For instance, the frangible airfoil portion 94 may be bonded and/or fused with the residual airfoil portion 92 using a thermoset or thermoplastic material. In another instance, the frangible airfoil portion 94 may be bonded to the residual airfoil portion 92 during an additive manufacturing process, described in more detail below. In certain embodiments, bonding the frangible airfoil portion 94 to the residual airfoil portion 92 may form a crack stopper at the fusion line 88. For example, cracks that form in the frangible airfoil portion 94 (such as during an even that creates imbalance on the fan blades 44) may perpetuate through the first material 84, reach the fusion line 88, and not be able to cross the fusion line 88 and/or grow into the residual airfoil portion 92.

As illustrated, in one embodiment, a leading edge sheath 89 may be coupled to at least a portion of the leading edge 72 of the airfoil 62 and at least partially extend along at least one of the pressure side 68 or suction side 70. For instance, the leading edge sheath 89 may extending from the airfoil tip 66 along at least a portion of the span S of the airfoil 62. The leading edge sheath 89 may be bonded to and provide protection for the leading edge 72 of the airfoil 62. It should be recognized that the leading edge sheath 89 may be coupled to the leading edge 72 suing any suitable means, such as by adhesives, tape, welding, and/or mechanical fasteners (e.g., bolts, screws, and rivets). The leading edge sheath 89 may generally strengthen the airfoil 62, minimize danger to the airfoil 62 (e.g., the fan blade 44) during a fan blade out event, and protect the airfoil 62 from foreign object damage.

In one embodiment, the leading edge sheath 89 may extend along the entire span S. As such, the leading edge sheath 89 may protect the entire leading edge 72 of the airfoil 62 from the airfoil root 64 to the airfoil tip 66. In other embodiments, the leading edge sheath 89 may protect only a portion of the leading edge 72 of the airfoil 62, such as a portion of the leading edge 72 toward the airfoil tip 66. Further, the leading edge sheath 89 may extend along the chord C at each point along the span S. For example, the leading edge sheath 89 may define a sheath length 96 along the chord C at each point along the span S. In one embodiment, the sheath length 96 may extend to at least the internal cavity 82 along one of the pressure side 68 or suction side 70. Further, in certain embodiments, the sheath length 96 may extend at least to an aft most position 90 of the internal cavity 82. Thought it should be recognized that the leading edge sheath 89 may extend past the internal cavity 82 toward the trailing edge 74. Further, the leading edge sheath 89 may extend along the sheath length 96 along both of the pressure side 68 and suction side 70 (e.g., a symmetrical leading edge sheath). In other embodiments, the leading edge sheath 89 may extend along less than the sheath length 96 along at least one of the pressure or suction side 68, 70.

Referring particularly to the exemplary airfoil 62 of FIG. 3, the airfoil 62 may be configured to fracture, break, or liberate at approximately the fusion line 88 up to the airfoil tip 66 (e.g., the frangible airfoil portion 94) following a loading or impact upon the airfoil 62. For example, the airfoil 62 configured as the fan blade 44 within the fan casing 40 or nacelle of the gas turbine engine 10 (FIG. 1) may be configured to detach, decouple, deform, break, or liberate the frangible airfoil portion 94 of the airfoil 62 above the fusion line 88. In one non-limiting example, the frangible airfoil portion 94 of the airfoil 62 may be defined as the difference in spanwise dimensions of the frangible airfoil portion 94 and the residual airfoil portion 92. For example, the frangible airfoil portion 94 may be defined within approximately 3% to approximately 15% of the total span S from the airfoil tip 66.

During operation of the gas turbine engine 10, such as following an event generating substantial imbalance in the fan rotor 38 or LP shaft 34, the frangible airfoil portion 94, e.g., of the fan blade 44, as shown and described in various embodiments in FIGS. 3-7, may be configured to deform or partially or fully detach from the remainder of the airfoil 62, e.g., along the fusion line 88. Further, the frangible airfoil portion 94 may detach (e.g., along the fusion line 88) while leaving all of or at least a portion of the residual airfoil portion 92. Events generating substantial unbalance in the fan rotor 38 and/or LP shaft 34 may include, but are not limited to, foreign object damage (e.g., bird strikes, ice ingestion, other debris, etc.) or fan blade 44 detachment. Detaching or decoupling the frangible airfoil portion 94 may reduce undesired unbalance or vibrations as the fan rotor 38 and/or LP shaft 34 continue to rotate. Furthermore, the embodiments of the airfoil 62 generally shown and described in regard to FIGS. 3-7 may enable a lighter fan casing 40 or nacelle, such as reducing an amount of metal materials or abradable material of the fan casing 40 or nacelle.

Referring still to FIG. 3, in one embodiment, the frangible airfoil portion 94 may extend from the airfoil tip 66 along at least 10% of the span S towards the airfoil root 64. For instance, the frangible airfoil portion 94 may define a frangible height 98 extend from the airfoil tip 66 along at least 10% of the span S, such as along at least 15% but less than 50% of the span S, towards the airfoil root 64. It should be recognized that the frangible airfoil portion 94 may extend along a frangible height 98 equal to approximately the same percentage of the span S along the chord C. Though in other embodiments, the frangible height 98 may extend along a variable percentage of the span S along the fusion line 88. It should be recognized that the frangible airfoil portion 94 may extend along any desirable span S of the airfoil 62 from the airfoil tip 66.

Figure 4:
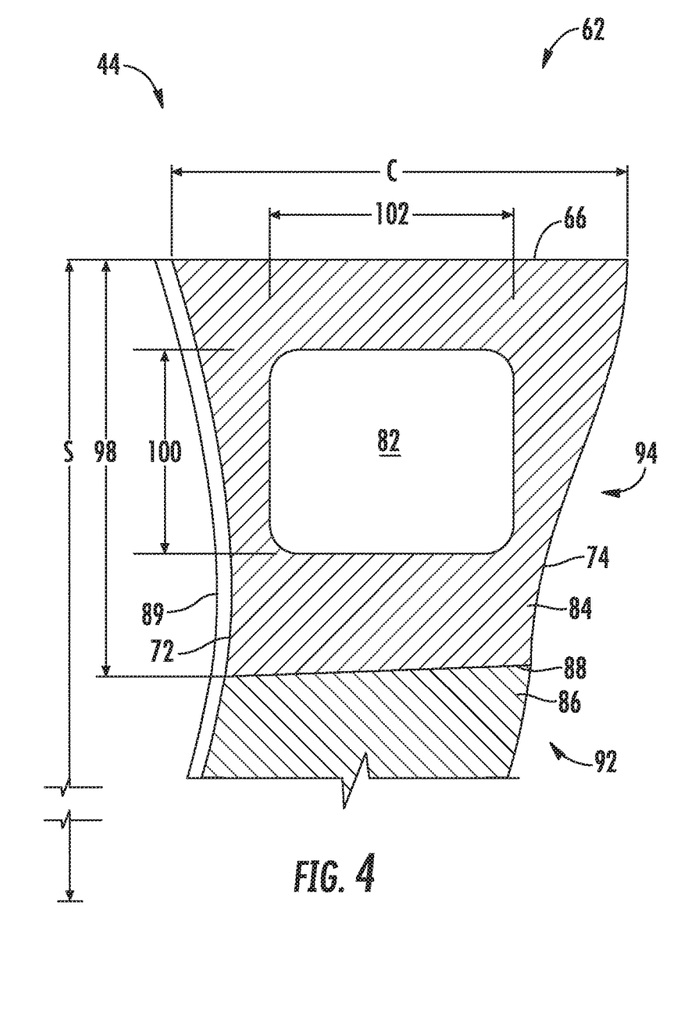
FIG. 4 illustrates one embodiment of the frangible airfoil portion in accordance with aspects of the present subject matter, particularly illustrating a cross-section of the frangible airfoil portion along a span and a chord.

Referring now to FIG. 4, one embodiment of the frangible airfoil portion 94 is illustrated according to aspects of the present subject matter. Particularly, FIG. 4 illustrates a cross-section of the frangible airfoil portion 94 along the span S and the chord C at each point along the span S. In the illustrated embodiment, the internal cavity 82 may have a cavity height 100. For instance, the frangible airfoil portion 94 may define a cavity height 100 of the internal cavity 82. The cavity height 100 may extend along 5% to 10% of the span S. In other embodiments, the cavity height 100 may extend along 5% to 15% of the span S. It should be recognized that the cavity height 100 may extend up to the frangible height 98. In one embodiment, the internal cavity 82 may be centrally positioned along the span S of the frangible airfoil portion 94. Or more particularly, a center of the cavity height 100 may be approximately positioned at a center of the frangible height 98. In other embodiments, the internal cavity 82 may be offset toward one of the airfoil tip 66 or the fusion line 88. For instance, the center of the cavity height 100 may positioned toward to the airfoil root 64 (FIG. 3) or the airfoil tip 66 relative to the center of the frangible height 98.

As further illustrated in FIG. 4, the internal cavity 82 may define a cavity length 102 along the chord C at each point along the span S. In such an embodiment, the cavity length 102 may extend between 33% and 66% of the chord C at each point along the span S. Further, the internal cavity may be centrally positioned along the chord C between the leading edge 72 and trailing edge 74 at each point along the span S. Or more particularly, a center of the cavity length 102 may be positioned at a center of the chord C at each point along the span S. Though, in other embodiments, the internal cavity 82 may be offset toward one of the leading edge 72 or trailing edge 74 of the airfoil 62. For instance, the center of the cavity length 102 may be positioned toward the leading edge 72 or the trailing edge 74 relative to the center of the chord C at each point along the span S.

Figure 5:
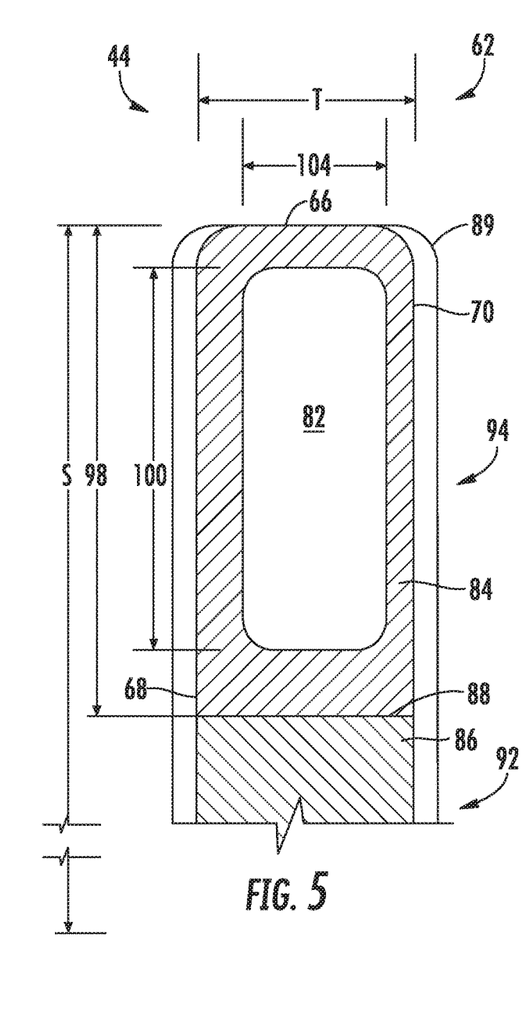
FIG. 5 illustrates another embodiment of the frangible airfoil portion in accordance with aspects of the present subject matter, particularly illustrating a cross-section of the frangible airfoil portion along a thickness and a chord.

Referring now to FIG. 5, another embodiment of the frangible airfoil portion 94 is illustrated according to aspects of the present subject matter. Particularly, FIG. 4 illustrates a cross-section of the frangible airfoil portion 94 along the span S and a thickness T at each point along the span S. For instance, the airfoil 62 may define the thickness T between the pressure side 68 and the suction side 70 at each point along the span S. As illustrated, the internal cavity 82 may define a cavity width 104 at each point along the span S extending at least partially between the pressure side 68 and suction side 70. Further, the internal cavity 82 may be centrally positioned between the pressure side 68 and suction side 70 at each point along the span S. More particularly, a center of the cavity width 104 may be positioned at a center of the thickness T at each point along the span S. Though, in other embodiments, the internal cavity 82 may be offset toward one of the pressure side 68 or suction side 70 of the airfoil 62. For instance, the center of the cavity width 104 may be positioned toward the pressure side 68 or the suction side 70 relative to the center of the thickness T at each point along the span S.

In certain embodiments, the residual airfoil portion 92 may define a portion of the airfoil 62 with a first overall bending stiffness. Similarly, the frangible airfoil portion 94 may define a portion of the airfoil 62 with a second overall bending stiffness less than the first overall bending stiffness of the residual airfoil portion 92. For instance, the internal cavity 82 may reduce an amount of the airfoil 62 above the fusion line 88 along the span S and the chord C. As such, the frangible airfoil portion 94 may have a reduced stiffness allowing the frangible airfoil portion 94 to fracture, break, liberate, decouple, deform, deflect, etc. at or above the fusion line 88 toward the airfoil tip 66 as described above. It should be recognized that the residual airfoil portion 92 may be substantially free of holes or voids. For instance, the first overall bending stiffness may be approximately the bending stiffness of the material(s) forming the residual airfoil portion 92 and/or the airfoil 62. Further, it should also be appreciated that the first material 84 of the frangible airfoil portion 94 with a lower modulus of elasticity than the second material 86 of the residual airfoil portion 92 may also contribute to the lower bending stiffness of the frangible airfoil portion 94, as described in more detail below.

Figure 6:
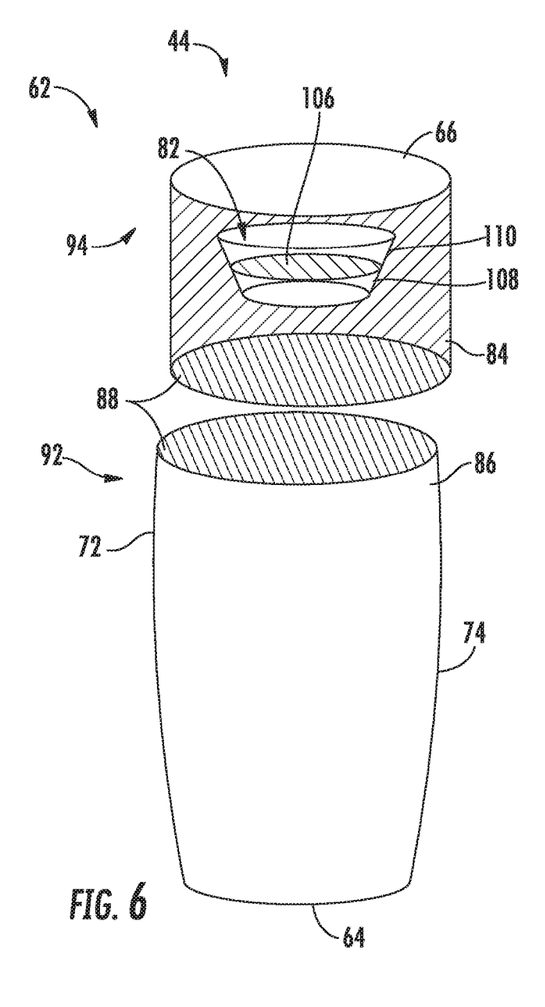
FIG. 6 illustrates another embodiment of the fan blade in accordance with aspects of the present subject matter, particularly illustrating a frangible airfoil portion including an internal cavity with a variable cross-section along the span.

Referring now to FIG. 6, another embodiment of the airfoil 62 (such as the fan blade 44) is illustrated according to aspects of the present subject matter. Particularly, FIG. 6 illustrates a frangible airfoil portion 94 including an internal cavity 82 with a variable cross-section along the span S. For instance, the internal cavity 82 may define a cross-section 106 at each point along the span S. In certain embodiments, an area of the cross-section 106 may be approximately constant throughout the cavity height 100 (see, e.g., FIGS. 4 and 5). In other embodiments, as illustrated in FIG. 6, the area of the cross-section 106 may vary along the cavity height 100. For instance, the internal cavity 82 may taper along the span S from the airfoil tip 66 to the fusion line 88. More particularly, in certain embodiments, the cavity length 102 (see FIG. 4) at a first point along the span 108 may be different than the cavity length 102 at a second point along the span 110. Further, the cavity width 104 (see FIG. 5) at the first point along the span 108 may be different than the cavity width 104 at the second point along the span 110. It should be appreciated that either or both of the cavity width 104 and cavity length 102 may vary along the span S of the airfoil 62. As such, it should be recognized that the area of the cross-section 106 may also vary between the first point along the span 108 and the second point along the span 110. For example, the area the cross-section 106 may generally increase along the cavity height 100 toward the airfoil tip 66.

Moreover, in certain embodiments, the bending stiffness of the frangible airfoil portion 94 may decrease between the fusion line 88 and the airfoil tip 66. More particularly, removing more material from the frangible airfoil portion 94 toward the airfoil tip 66 may reduce the bending stiffness toward the airfoil tip 66 compared to the bending stiffness proximate to the fusion line 88. As such, a tapered internal cavity 82 may define a frangible airfoil portion 94 with a bending stiffness that reduces along the frangible height 98 from the fusion line 88 to the airfoil tip 66.

Figure 7:
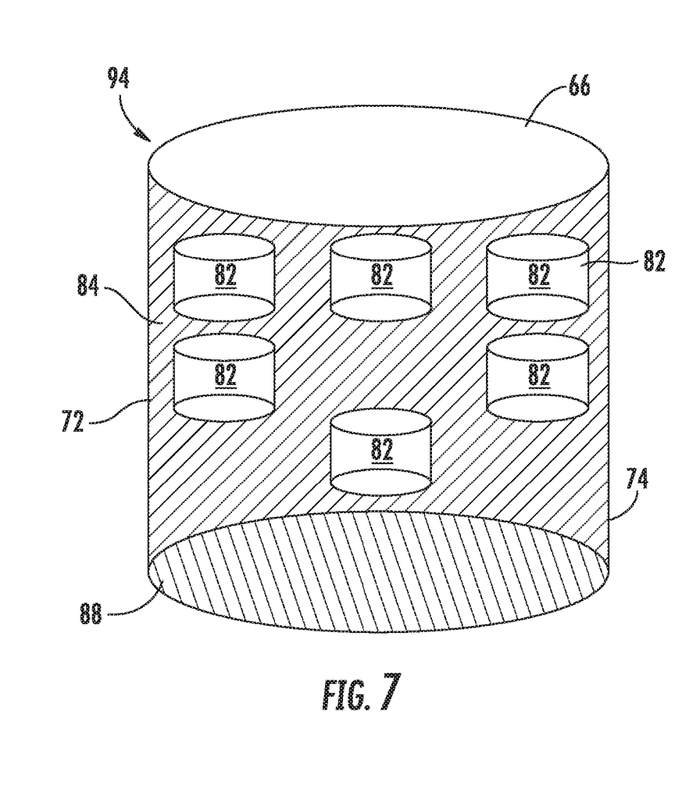
FIG. 7 illustrates another embodiment of the frangible airfoil portion in accordance with aspects of the present subject matter, particularly illustrating a frangible airfoil portion with more than one internal cavity.

Referring now to FIG. 7, another embodiment of the frangible airfoil portion 94 is illustrated according to aspects of the present subject matter. Particularly, FIG. 7 illustrates a frangible airfoil portion 94 with more than one internal cavity 82. For instance, in certain embodiments, the frangible airfoil portion 94 may further define a second internal cavity 112. Further, as illustrated, the frangible airfoil portion 94 may include a plurality of internal cavities 82. It should be recognized that the second internal cavity 112 and/or the plurality of internal cavities 82 may be configured generally the same or similar to the internal cavity 82 as described in regards to FIGS. 2-6. More particularly, the second internal cavity 112 and/or the plurality of internal cavities 82 may define the same or similar shape (e.g, the same cavity height, length, width, and cross-sections 100, 102, 104, 106). Though, in other embodiments, two or more internal cavities 82 may define a different shape (e.g., at least one different cavity height, length, width, or cross-section 100, 102, 104, 106). Further, the internal cavities 82 may be spaced apart along at least one of the span S, chord C, thickness T, or any combination of the three.

It should be recognized that the more internal cavities 82 that extend to a specific point along the span S, the more the bending stiffness of the frangible airfoil portion 94 at that point along the span S may be reduced. Further, in certain embodiments, the number of internal cavities 82 may increase at each point along the span S from the fusion line 88 to the airfoil tip 66. As such, the bending stiffness of the frangible airfoil portion 94 may decrease from the fusion line 88 to the airfoil tip 66. It should be recognized that, in such an embodiment, the frangible airfoil portion 94 may be more easily deflected and/or detached toward the airfoil tip 66 and more difficult to deflect and/or detach toward the fusion line 88.

As explained briefly in regards to FIGS. 2 and 3 and shown generally in FIGS. 2-7, the frangible airfoil portion 94 may include the first material 84 defining the first modulus of elasticity. For instance, as illustrated, the frangible airfoil portion 94 may be made entirely from the first material 84. Further, the residual airfoil portion 92 may include the second material 86 defining the second modulus of activity greater than the first modulus of elasticity. In one particular embodiment, the second material 86 may include at least one of a metal or composite (e.g., a ceramic matrix composite) while the first material 84 may include at least one of a composite or a polymer with a lower modulus of elasticity than the second material 86. As such, the difference in the modulus of elasticity of the first and second materials 84, 86 may contribute to a reduction in the overall bending stiffness between the residual airfoil portion 92 and the frangible airfoil portion 94. For instance, the combination of the first material 84 and internal cavity(ies) 82 may define the second overall bending stiffness less than the first overall bending stiffness of the residual airfoil portion 92.

It should be appreciated the frangible airfoil portion 94 and/or residual airfoil portion 92 may include additional materials with moduli of elasticity higher and/or or lower than the first and or second moduli of elasticity. For instance, the second material 86 and any additional materials may define the first overall bending stiffness for the residual airfoil portion 92. Similarly, the first material 84, internal cavity 82, and any additional materials may define the second overall bending stiffness for the frangible airfoil portion 94 that is less than the first overall bending stiffness. It should be appreciated that the second overall bending stiffness less than the first overall bending stiffness may allow the frangible airfoil portion 94 to deform and/or detach at or above the fusion line 88 as described generally in regards to FIG. 3.

In one embodiment, the airfoil 62, the frangible airfoil portion 94, and/or residual airfoil portion 92 may include at least one of a metal, metal alloy, a polymer or composite. For instance, the airfoil 62 may be formed at least partially from a ceramic matrix composite. More particularly, in certain embodiments, the residual airfoil portion 92 may be formed from one or more ceramic matrix composite prepreg plies. In another embodiment, the residual airfoil portion 92 may be formed from a ceramic matrix composite woven structure (e.g., a 2D, 3D, or 2.5D woven structure). In other embodiments, the residual airfoil portion 92 may be formed at least partially from a metal, such as but not limited to, steel, titanium, aluminum, nickel, or alloys of each. For instance, in certain embodiments, the residual airfoil portion 92 may be cast. Though, it should be recognized that the residual airfoil portion 92 may be formed from multiple materials, such as a combination of metals, metal alloys, and/or composites. Further, the second material 86 may include any of these materials or components of these materials.

In one embodiment, the frangible airfoil portion 94 may be made from a polymer. For example, the first material 84 of the frangible airfoil portion 94 may be a polymer (such as a thermoplastic or a thermoset). For instance, in one embodiment, the first material 84 may include an additive polymer structure. In such an embodiment, the internal cavity(ies) 82 may be formed in the frangible airfoil portion 94 using additive manufacturing. Further, it should also be recognized that the residual airfoil portion 92 may also be formed from additive manufacturing. For instance, the residual airfoil portion 92 may be formed via additive manufacturing utilizing the second material 86. Similarly, the frangible airfoil portion 94 may be formed via additive manufacturing utilizing the first material 84. As such, the entire airfoil 62 may be formed using additive manufacturing, as described in more detail below.

Further, it should be recognized that the airfoil 62, residual airfoil portion 92, and/or the frangible airfoil portion 94 may be formed from any further or additional materials so long as the first overall bending stiffness (i.e., the residual airfoil portion 92) is greater than the second overall bending stiffness (i.e., the frangible airfoil portion 94). For instance, in one embodiment, the residual airfoil portion 92 may be formed from composites utilizing a fibers with a first stiffness (e.g., carbon) while the frangible airfoil portion 94 is formed from composites utilizing fibers with a second stiffness less than the first stiffness (e.g., glass or a polymer).

Composite materials may include, but are not limited to, metal matrix composites (MMCs), polymer matrix composites (PMCs), or ceramic matrix composites (CMCs). Composite materials, such as may be utilized in the airfoil 62, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIV-IIC®), alumina silicates (e.g., Nextel's 440 and 480), and chopped whiskers and fibers (e.g., Nextel's 440 and SAF-FIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Similarly, in various embodiments, PMC materials may be fabricated by impregnating a fabric or unidirectional tape with a resin (prepreg), followed by curing. For example, multiple layers of prepreg may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., the pressure side 68 or the suction side 70). The PMC material is placed inside of a bag and a vacuum is utilized to hold the PMC material against the die during curing. In still other embodiments, the airfoil 62 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers (plies). The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

In general, the exemplary embodiments of the airfoil 62 described herein may be manufactured or formed using any suitable process. However, in accordance with several aspects of the present subject matter, the airfoil 62 may be formed using an additive-manufacturing process, such as a 3D printing process. The use of such a process may allow the airfoil 62 to be formed integrally, as a single monolithic component, or as any suitable number of sub-components. For example, at least one of the frangible airfoil portion 94 or the residual airfoil portion 92 may be formed using an additive-manufacturing process. In particular, at least one internal cavity 82 may be formed in the frangible airfoil portion 94 via an additive-manufacturing process. Forming the internal cavity(ies) 82 via additive manufacturing may allow the internal cavity(ies) 82 to be integrally formed and include a variety of features not possible when using prior manufacturing methods. For example, the additive manufacturing methods described herein enable the manufacture of internal cavity(ies) 82 having any suitable size and shape with one or more configurations, some of these novel features are described herein. Further, additive manufacturing may allow the airfoil 62 to be formed where the frangible airfoil portion 94 includes a material (e.g., the first material 84) with a lower bending stiffness than a material (e.g, the second material 86) used to form the residual airfoil portion 92.

As used herein, the terms "additive manufacturing," "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the airfoil 62, the residual airfoil portion 92, the frangible airfoil portion 94, and/or internal passageways such as the internal cavity 82, openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the airfoil 62 described herein. For example, such components may include thin additively manufactured layers and unique passageways, such as the internal cavity (ies) 82. In addition, the additive manufacturing process enables the manufacture of a single component having different materials such that different portions of the component may exhibit different performance characteristics. The successive, additive nature of the manufacturing process enables the construction of these novel features. As a result, the airfoil 62 described herein may exhibit improved performance and reliability.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil defining a span extending between a root and a tip, the airfoil comprising:
   a frangible airfoil portion being frangible, the frangible airfoil portion extending from a leading edge to a trailing edge and extending from the tip to a fusion line along the span, the frangible airfoil portion including a first material defining a first modulus of elasticity, and wherein the frangible airfoil portion defines an internal cavity; and
   a residual airfoil portion coupled to the frangible airfoil portion extending from the fusion line to the root along the span, the residual airfoil portion including a second material defining a second modulus of elasticity greater than the first modulus of elasticity, wherein the residual airfoil portion meets the frangible airfoil portion at the fusion line, wherein the frangible airfoil portion is directly bonded to the residual airfoil portion at the fusion line, and wherein the first material is different from the second material.

2. The airfoil of claim 1, wherein the frangible airfoil portion deforms or partially or fully detaches relative to the residual airfoil portion at the fusion line following an event creating imbalance.

3. The airfoil of claim 1, wherein the airfoil is a fan blade of a gas turbine engine.

4. The airfoil of claim 1, wherein the frangible airfoil portion extends from the tip along at least 10% of the span towards the root.

5. The airfoil of claim 1, wherein the frangible airfoil portion extends from the tip along at least 15% but less than 50% of the span towards the root.

6. The airfoil of claim 1, wherein the internal cavity has a cavity height extending along 5% to 10% of the span.

7. The airfoil of claim 1, wherein the airfoil further defines a chord at each point along the span extending between the leading edge and the trailing edge, wherein the internal cavity defines a cavity length along the chord at each point along the span, wherein the cavity length extends between 33% and 66% of the chord at each point along the span.

8. The airfoil of claim 1, wherein the airfoil further defines a chord at each point along the span extending between the leading edge and the trailing edge, wherein the internal cavity defines a cavity length along the chord at each point along the span, wherein the cavity length at a first point along the span is different than the cavity length at a second point along the span.

9. The airfoil of claim 1, wherein the airfoil defines a pressure side and a suction side, wherein the internal cavity defines a cavity width at each point along the span extending at least partially between the pressure side and suction side, and wherein the cavity width at a first point along the span is different than the cavity width at a second point along the span.

10. The airfoil of claim 1, wherein the airfoil further defines a pressure side and a suction side, wherein the airfoil further comprises:
    a leading edge sheath coupled to at least a portion of the leading edge of the airfoil and at least partially extending along at least one of the pressure side or suction side.

11. The airfoil of claim 1, wherein the frangible airfoil portion is formed via additive manufacturing.

12. The airfoil of claim 1, wherein the frangible airfoil portion further defines a second internal cavity.

13. A gas turbine engine defining a central axis, the gas turbine engine comprising:
    an engine shaft extending along the central axis;
    a compressor attached to the engine shaft and extending radially about the central axis;
    a combustor positioned downstream of the compressor to receive a compressed fluid therefrom;
    a turbine mounted on the engine shaft downstream of the combustor to provide a rotational force to the compressor; and
    a plurality of airfoils operably connected to the engine shaft, each of the plurality of airfoils defining a span extending between a root and a tip, each airfoil comprising:
        a frangible airfoil portion being frangible, the frangible airfoil portion extending from a leading edge to a trailing edge and extending from the tip to a fusion line along the span, the frangible airfoil portion including a first material defining a first modulus of elasticity, and wherein the frangible airfoil portion defines an internal cavity; and
        a residual airfoil portion coupled to the frangible airfoil portion extending from the fusion line to the root along the span, the residual airfoil portion including a second material defining a second modulus of elasticity greater than the first modulus of elasticity, wherein the residual airfoil portion meets the frangible airfoil portion at the fusion line, wherein the frangible airfoil portion is directly bonded to the residual airfoil portion at the fusion line, and wherein the first material is different from the second material.

14. The gas turbine engine of claim 13, further comprising a fan section including the plurality of airfoils configured as fan blades.

15. The gas turbine engine of claim 13, wherein the frangible airfoil portion extends from the tip along at least 10% of the span towards the root.

16. The gas turbine engine of claim 13, wherein the frangible airfoil portion extends from the tip along at least 15% of the span towards the root.

17. The gas turbine engine of claim 13, wherein the frangible airfoil portion defines a cavity height of the internal cavity extending along 5% to 10% of the span.

18. The gas turbine engine of claim 13, wherein each airfoil further defines a chord at each point along the span extending between the leading edge and the trailing edge, wherein the internal cavity defines a cavity length along the chord at each point along the span, and wherein the cavity length extends between 33% and 66% of the chord at each point along the span.

* * * * *